US006914689B2

(12) United States Patent
Bruce

(10) Patent No.: US 6,914,689 B2
(45) Date of Patent: Jul. 5, 2005

(54) PRINTER DOCUMENT VIEWER

(75) Inventor: David T. Bruce, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1 day.

(21) Appl. No.: 10/650,898

(22) Filed: Aug. 28, 2003

(65) Prior Publication Data

US 2004/0036900 A1 Feb. 26, 2004

Related U.S. Application Data

(63) Continuation of application No. 09/783,445, filed on Feb. 14, 2001, now Pat. No. 6,678,064.

(51) Int. Cl.$^7$ .............................................. G06F 15/00
(52) U.S. Cl. ...................... 358/1.12; 358/1.11; 358/1.9; 358/1.13; 358/1.14
(58) Field of Search ............................... 358/1.12, 1.9, 358/1.11, 1.13, 1.14

(56) References Cited

U.S. PATENT DOCUMENTS 6,678,064 B2 * 1/2004 Bruce ........................ 358/1.12

* cited by examiner

Primary Examiner—Twyler Lamb

(57) ABSTRACT

Systems and corresponding methods that facilitate printing and controlling the printing process for multiple documents on a printing apparatus are provided. Multiple users may select a document for printing by interacting with control menus available at the printing site. In one embodiment, a printing system for processing one or more print requests includes: a print queue for storing data associated with one or more print requests, the print requests stored in a queue in the order received; a display screen for displaying the content of the print queue; control interface for controlling the processing order of the print requests in the queue; and executable code stored in a memory, wherein execution of the code by a processor causes the processor to process the print requests stored in the queue in response to user interaction with the control interface.

8 Claims, 4 Drawing Sheets

PRINTER DOCUMENT VIEWER

CROSS REFERENCE TO RELATED APPLICATION

This is a continuation of application Ser. No. 09/783,445 filed on Feb.14, 2001 now U.S. Pat. No. 6,678,064 which is hereby incorporated by reference herein.

BACKGROUND

1. Field of the Invention

The present invention relates generally to printing methods and systems and, more particularly, to printing services in a communications network.

Copyright & Trademark Notice

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and shall not be construed to limit the scope of this invention to material associated with such marks.

2. Related Art

Currently, to print one or more documents a user interacts with a computing system such as a personal computer or a computer terminal connected to a computer network. Using the computing system the user submits a print request for printing one or more pages of the document. When one or more print requests are submitted to a single printer, the print requests are queued up. The printer then processes each request in order of priority. Computer software can be executed on the computing system to allow a user to manipulate the printing order for each request, to pause the printing process, or to delete a print request from the queue.

Unfortunately, once a print request is submitted and the print data is transferred to the printer, the user loses control over the printing process. In other words, documents that are entered into the print queue are typically printed without the user having a chance to decide when he wishes for the printing process to start, or end, for that matter. This lack of control over the printing process is undesirable, especially when the printer is not within the immediate vicinity of the computing system where the print request is generated. For example, in the case of a shared network printer, multiple print requests may be submitted by multiple users. Some or all these users may be unable to immediately retrieve the printed results, due to time or distances constraints.

Furthermore, without the intervention of a human operator, in most instances printing to a shared printer can be chaotic. For example, the users will have to sort through the multiple printed material to ensure that they pick the printed material and pages that belong to them. Also, processing and printing large files occasionally may take a very long time, and one user with a smaller print job may have to wait for a larger print job to finish if the print request for the smaller job was received after the print request for the larger job. It would be very useful, if the users had the option to control the printing process at the printing location by interacting with the printing device.

A system and method that provides for multiple users to submit multiple print requests to a shared printer first and later choose the printing time and order at the printing site are desirable.

SUMMARY

In accordance with this invention, a system and corresponding methods that facilitate printing and controlling the printing process for multiple documents on a printing apparatus are provided. Multiple users may select a document for printing by interacting with control menus available at the printing site.

For purposes of summarizing, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

In one embodiment, a printing system for processing one or more print requests includes: a print queue for storing data associated with one or more print requests, a display screen for displaying the content of the print queue; control interface for controlling the processing order of print requests in the queue; and executable code stored in a memory, wherein execution of the code by a processor causes the processor to process the print requests stored in the queue in response to user interaction with the control interface.

In another embodiment, a method for processing one or more print requests submitted to a printer, said printer having a queue, a display, and user interface, includes: storing the print requests in the queue; displaying the print requests stored in the queue; reconfiguring the order of the print requests stored in the queue; selecting a print request stored in the queue; printing the selected print request; deleting the selected print request; displaying the content of the file associated with the selected print request on the display screen; scrolling through the content of the file associated with the selected print request; selecting the next print request stored in the queue; or selecting the prior print request stored in the queue.

In still another embodiment, a printing system for processing one or more printing requests, includes: a means for storing said one or more print requests in a first order; a means for rearranging said requests in a second order; a means for displaying the content of the storing means; and a means for displaying the content of said one or more print requests.

These and other embodiments of the present invention will also become readily apparent to those skilled in the art from the following detailed description of the embodiments having reference to the attached figures, the invention not being limited to any particular embodiments disclosed.

DETAILED DESCRIPTION

Figure 1:
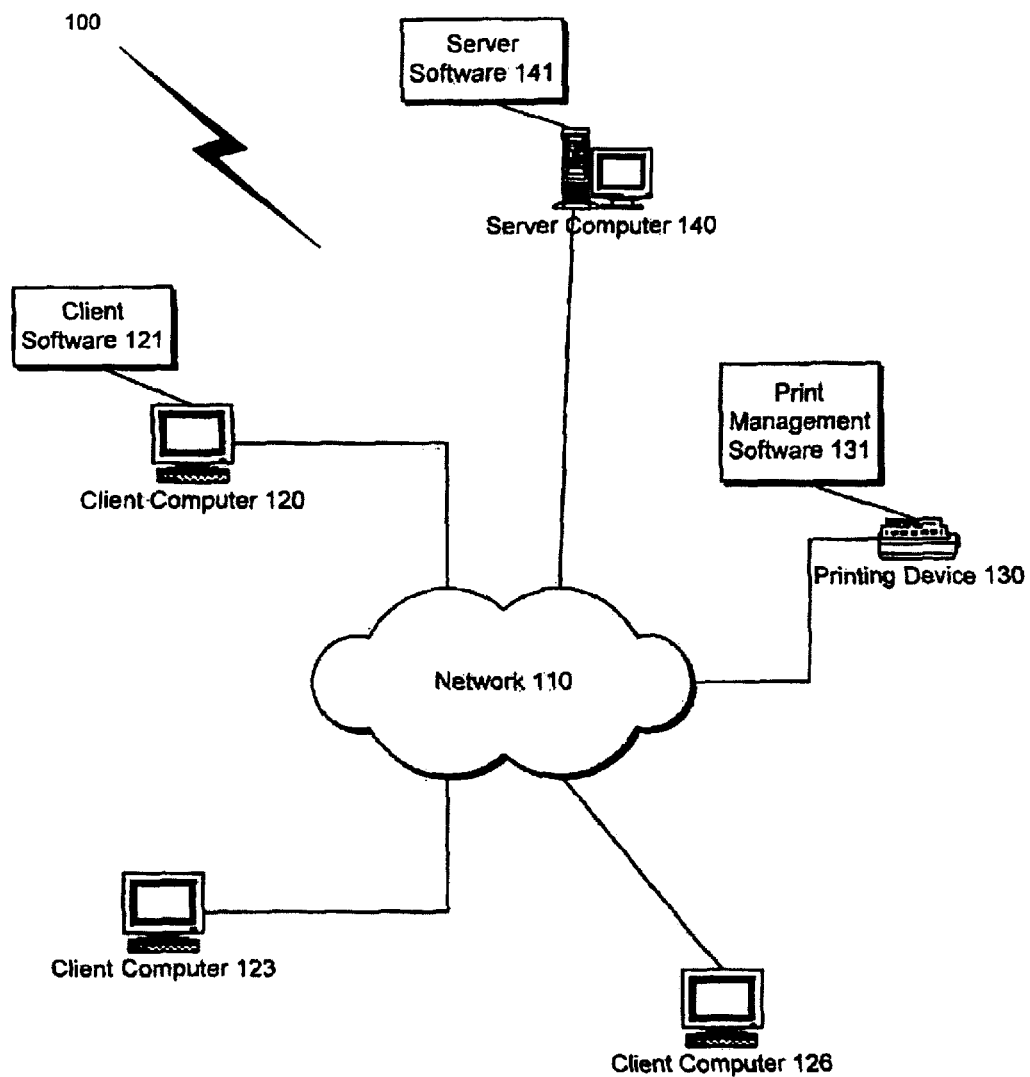
FIG. 1 illustrates a block diagram of an environment in which a system of the present invention may operate, in accordance with one or more embodiments.

In accordance with one or more aspects of the system, a printing system and corresponding methods that facilitate and provide printing services for viewing, controlling, and processing one or more print requests submitted to a printer attached to a communication network are provided.

The services provided by the system of this invention, may be accessed remotely, in one or more embodiments, and/or through an on-line service provider. A service provider is an entity that operates and maintains the computing systems and environment, such as server system and architectures, that promote the delivery of print requests to a printing device in a communication network. Typically, a server architecture includes the infrastructure (e.g., hardware, software, and communication lines) that stores and offers the printing or online services of this invention.

In the following, numerous specific details are set forth to provide a thorough description of various embodiments of the invention. Of course, certain embodiments of the invention may be practiced without these specific details or with some variations in detail. Embodiments of the present invention are understood by referring to FIGS. 1–3 of the drawings. Throughout the drawings, components that correspond to components shown in previous figures are indicated using the same reference numbers.

Nomenclature

The detailed description that follows, in parts refers to terms of processes and symbolic representations of operations performed by conventional computers, including computer components. For the purpose of this disclosure, a computer may be any microprocessor or processor (hereinafter referred to as processor) controlled device such as, by way of example, personal computers, workstations, servers, clients, mini-computers, main-frame computers, laptop computers, a network of one or more computers, mobile computers, portable computers, handheld computers, palm top computers, set top boxes for a TV, interactive televisions, interactive kiosks, personal digital assistants, interactive wireless devices, mobile browsers, or any combination thereof.

The computer may be a uniprocessor or multiprocessor machine. Program logic or other substrate configuration representing data and instructions, stored in memory cause the computer to operate in a specific and predefined manner. The program logic may advantageously be implemented as one or more modules. The modules may advantageously be configured to execute on one or more processors. The modules include, but are not limited to, software or hardware components that perform certain tasks. Thus, a module may include, by way of example, components, such as, software, processes, functions, subroutines, procedures, attributes, class components, task components, object-oriented software components, segments of program code, drivers, firmware, micro-code, circuitry, data, and the like.

The program logic is generally considered to be a sequence of computer-executable steps. These steps generally require manipulations of physical quantities. Usually, although not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, text, terms, numbers, records, files, or the like. It should be kept in mind, however, that these and some other terms should be associated with appropriate physical quantities for computer operations, and that these terms are merely conventional labels applied to physical quantities that exist within and during operation of the computer.

For the most part, the operations described herein are operations performed by a computer or a machine in conjunction with a human operator or user that interacts with the computer or the machine. The programs, modules, processes, methods, and the like, described herein are but an exemplary implementation and are not related, or limited, to any particular computer, apparatus, or computer language. Rather, various types of general purpose computing machines or devices may be used with programs constructed in accordance with the teachings described herein.

System Architecture

Referring now to the drawings, FIG. 1 illustrates an environment in which a printing system 100 according to one embodiment may operate. In accordance with one aspect of the system, the environment includes one or more client computers (e.g., client computers 120, 123, and 126), server computer 140, and printing device (i.e., printer) 130. As depicted, client computer 120, server computer 140, and printing device 130 are connected to a communication network 110. In certain embodiments, printing device 130 may be directly connected to client computer 120 without the intervention of network 110. The terms "connected," "coupled," or any variant thereof, mean any connection or coupling, either direct or indirect, between two or more elements. The coupling or connection between the elements can be physical, logical, or a combination thereof.

In accordance with one aspect of the system, a user uses a client computer (e.g., client computers 120, 123, and 126) to submit one or more print requests to be printed by printing device 130. Server computer 140 and printing device 130, in certain embodiments, in combination or separately communicate with the client computers to service the submitted print requests. Communications network 110 provides the medium for transmitting communication packets between client computer 120, server computer 140, and/or printing device 130. Printing device 130 queues the submitted print requests in memory, processes data associated with the requests, and prints out the data in certain order. Network 110 may be established by way of wired or wireless technology in a well-known manner, or can be any type of communication network, such as the Internet, for example.

The Internet connects millions of computers world wide through standard common addressing systems and communication protocols. One of ordinary skill in the art will appreciate that network 110 may advantageously be comprised of one or a combination of other types of networks without detracting from the scope of the invention. Network 110 can include, for example, local area networks (LANs), wide area networks (WANs), public internets, private intranets, a private computer network, a secure internet, a private network, a public network, a value-added network, interactive television networks, wireless data transmission networks, two-way cable networks, satellite networks, interactive kiosk networks, and/or any other suitable communication network.

Printing device 130 can be any kind of printer and may include an adapter card for connecting to a communication network in addition to hardware and software necessary for servicing print requests. Alternatively, printing device 130 may serve as a stand alone printer connected to a print server such as server computer 140. In the former scenario, printing device 130 includes a processor and memory means to directly receive, store, and process print requests as transmitted by client computer 120; while in the latter scenario, server computer 140 performs the initial tasks of receiving, storing, and processing print requests, and then forwards data in printable format to printing device 130 for printing.

Figure 3:
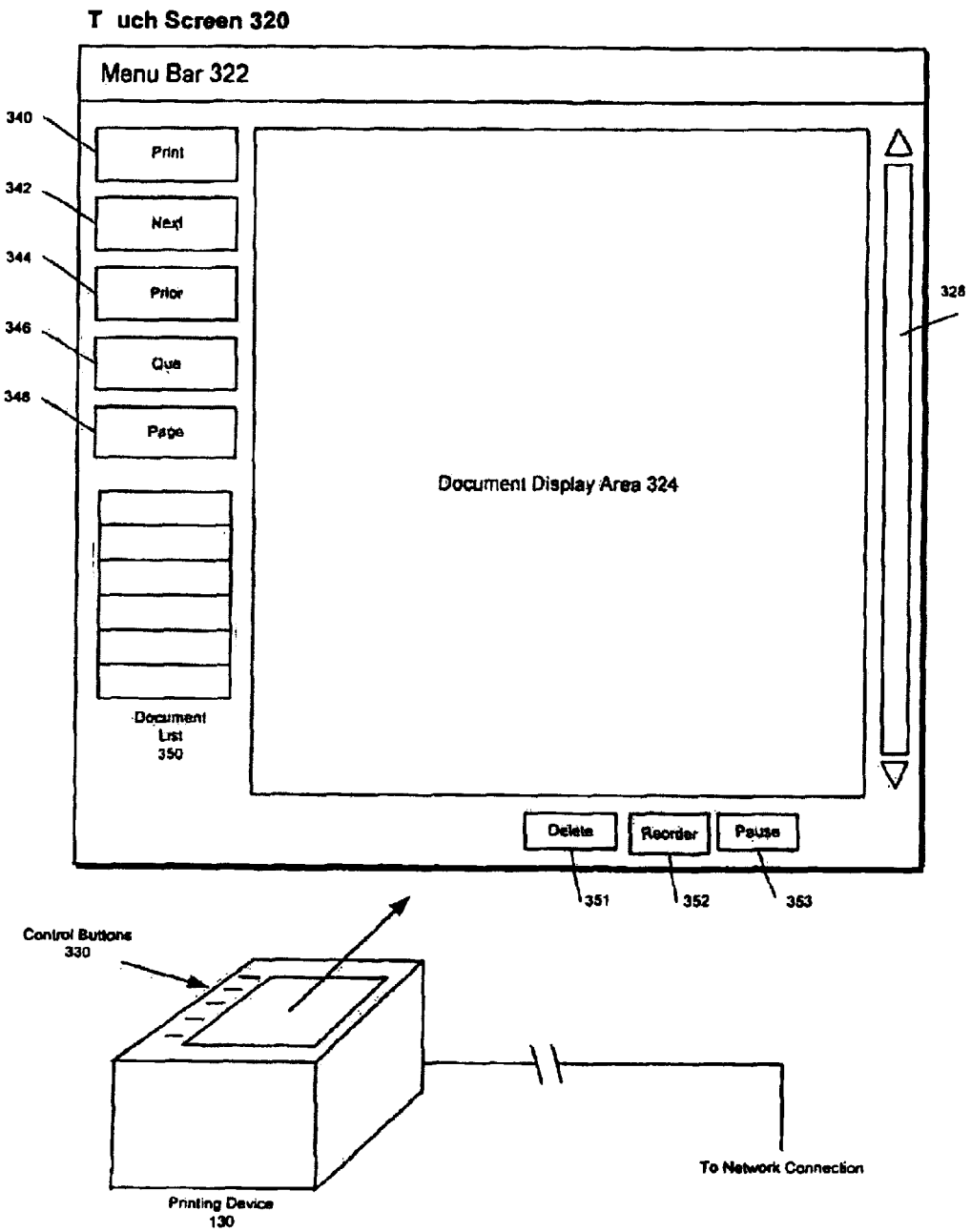
FIG. 3 illustrates the printing device of FIG. 1, and the corresponding display interface for processing print requests submitted to the printing device, in accordance with one embodiment.

Referring to FIG. 3, in one or more embodiments, printing device 130 includes a touch screen display 320, and control buttons 330. A touch screen display is a display screen that is sensitive to the touch of an instrument such as a human finger or a stylus. Touch screen 320 and control buttons 330 allow a user to interact with printing device 130 to select print requests pending in the printing device 130's print queue. The print queue is a logical storage area associated with space allocated in memory for storing print information. Depending on implementation, the memory is included in printing device 130, server computer 140, or both. Touch screen 320, in one embodiment, includes a clear glass panel overlaid onto, for example, a Cathode Ray Tube (CRT) or Liquid Crystal Display (LCD) screen.

In one embodiment, a plastic overlay on top of a metallic-coated glass layer, separated by spacers, is included over the glass panel, such that when pressure is applied to a region of the plastic overlay, the plastic layer shunts a current in the glass panel. The current defines the x-y coordinates of the point of pressure on the screen. The x-y coordinate information is then provided to application or system software that monitors the screen pointer for the system. In another embodiment, the metallic coated glass panel is used without the plastic overlay. The metallic coated screen senses the change in current from the charge in the touch instrument. The touch instrument emits a charge and is thus wired to the computer to indicate the x-y coordinates of the point touched on the screen.

Alternative embodiments of the system, may not implement touch screen technology, but may include other pointing or input devices (e.g., mouse, keyboard) to provide for user interaction with printing device 130. The print queue can be implemented in Random Access Memory (RAM) or other suitable memory known to those skilled in the art for storing data. As shown, various areas on touch screen 320 can be graphically divided into areas displaying a menu bar 322, buttons 340, 342, 344, 346, 348 and 351, 352, 353, document list 350, document display area 324, and viewing control tools 328, for example.

Menu bar 322 and graphic user interface (GUI) buttons 340, 342, 344, 346, 348, and 351, 352, 353 include interactive features (e.g., drop down lists, selectable buttons) for various functions that allow the user to operate printing device 130 to display, view, and select a print request stored in the print queue and to print the content of a print request, for example. Document list 350 includes a list of print requests pending in the print queue, for example. By interacting with menu bar 322 or the control buttons described above, a user can, for example, select a print request from document list 350. Upon selection of the print request from the print queue, print management software 131 (FIG. 1) causes a processor to display the content of the print request in document display area 324.

In some embodiments, the content of the print queue are displayed in document list 350 when a user presses button 346 ("Que"), for example. The content of individual print requests in the print queue may be displayed, selected, or referenced from document list 350, in a manner well-known in the art. User interaction with other buttons, such as buttons 340 ("Print") and 348 ("Page"), for example, causes the system to print one or more pages of a selected print request. A user may also interact with touch screen display 320 in other manners to control displaying and printing of print requests stored in the print queue.

For example, a user may select from a drop down list (not shown) provided as a part of menu bar 322 or interact with GUI buttons 342 ("Next"), 344 ("Prior"), 351 ("Delete"), 352 ("Reorder"), and 353 ("Pause") to respectively select, delete, or manage the printing order of print requests displayed in the document list 350. By pressing buttons 342 or 344, for example, a user may advance or regress through print requests in document list 350. By pressing button 351, for example, a user may delete a print request from document list 350 and as a result from the print queue. By pressing button 352, for example, a user may reorder the printing order of print requests stored in the print queue. Reordering the queued requests and other printing options may be also accomplished by selecting, dragging, and/or dropping the requests using the system pointer.

Certain options provided on the menu bar 322 may allow the user to perform actions equivalent to those associated with the GUI or control buttons 330. Therefore, in accordance with one or more embodiments, a user can perform various actions by interacting with the GUI buttons on touch screen 320, control buttons 330, and menu bar 322. Once a request is selected a user may press button 340 to print or button 353 to pause printing of the selected print request. In certain embodiments, control tools 328, such as scroll bars or other interactive GUIs, are implemented to allow a user to view and browse the content of a print request displayed in document display area 324.

In embodiments of the invention, printing device 130 is manufactured by Hewlett-Packard Company, Palo Alto, Calif., and includes a paper feeding mechanism for feeding a paper along a transfer path and a carriage to respond to the paper feeding mechanism. Further a printing head is attached to the carriage and a cylindrical platen is disposed to confront the printing head with the paper fed by the paper feeding mechanism in the transfer path. A driving mechanism is also included to drive the platen and the paper feeding mechanism.

In accordance with at least one embodiment, the driving mechanism includes a driving motor and a gear train for transmitting rotation of the single driving motor to the platen and the paper feeding mechanism. The rotation of said platen and paper feed by said paper feeding mechanism are synchronized with each other so that positions of impacts on a peripheral surface of the platen by the printing head are distributed over a whole region on the surface of the platen. Other embodiments are possible and can be directed to line printers, laser printers, inkjet printers, color printers, or any other suitable printing mechanisms.

As used herein, the terms server computer, printer server, or printing system are to be viewed as designations of one or more computing systems that include software for servicing requests submitted by client software 121 included in client computer systems connected to network 110. These terms are not to be otherwise limiting in any manner. Print management software 131, server software 141, and client software 121, for example, may be comprised of one or more modules that execute on one or more computing systems, as described in further detail below.

Hardware & Software Environments

The invention may be practiced either individually or in combination with suitable hardware or software architectures or environments described in further detail below. Typically, a computing system is composed of two environments, a software environment and a hardware environment. The hardware environment includes the machinery and equipment that provide an execution environment for the software. On the other hand, the software provides the execution instructions for the hardware.

In operation, a computing system needs both hardware and software to function. The software can be divided into two major classes including system software and application software. System software includes control programs, such as the operating system (OS) and information management systems that instruct the hardware how to function and process information. An example of system software is Microsoft Windows 2000® operating system generally used for managing the operation of personal computers.

Application software is a program that performs a specific task. In embodiments of the invention, system and application software are implemented and executed in one or more hardware environments to communicate and process print requests submitted by one or more users using client computers, and to print data associated with said requests. The data associated with the print request could include files generated by a software application executing on client computer 120, for example.

Figure 2A:
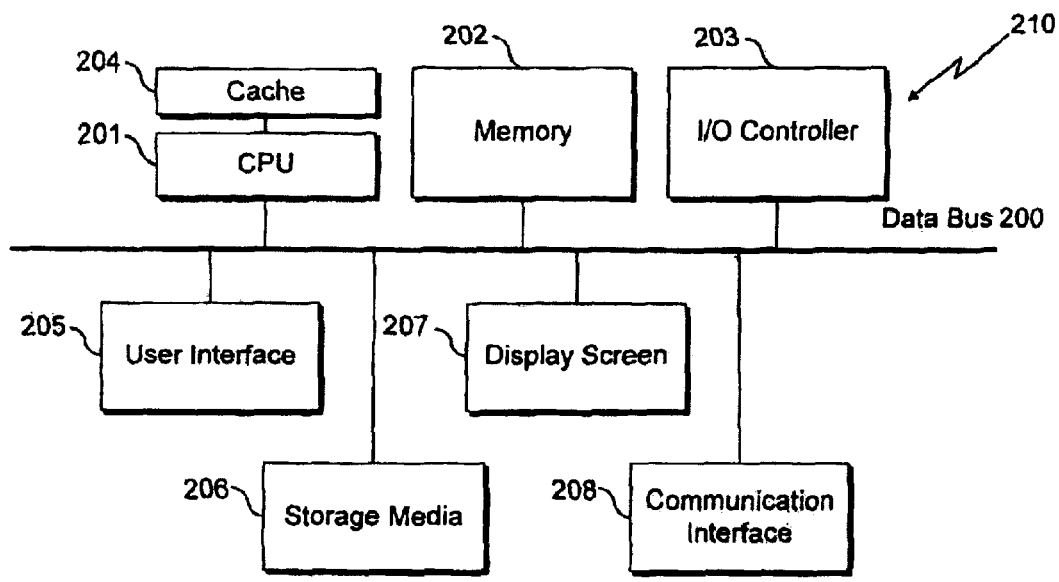
FIGS. 2A and 2B illustrates the software and the hardware environment that may promote the operation of the system illustrated in FIG. 1, in accordance with one or more embodiments.
Figure 2B:
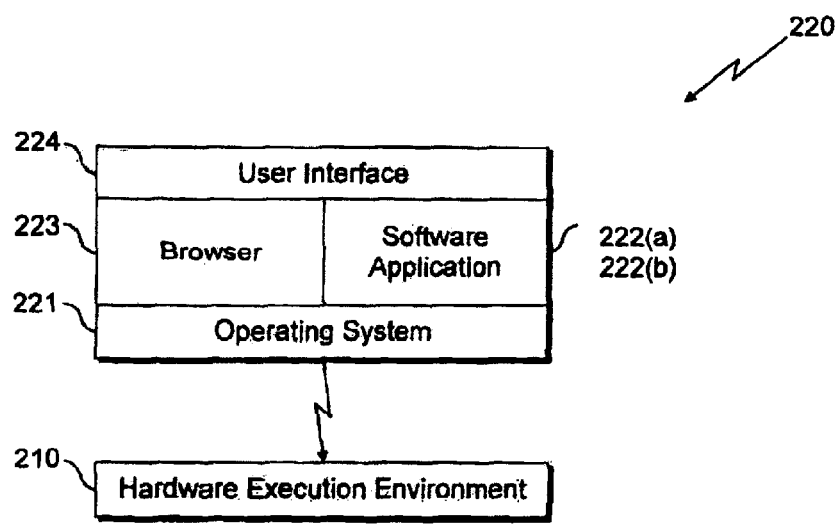

Client computer 120, server computer 140, and printing device 130 may be implemented in association with computing system 210 (FIG. 2A). Client and server software running on the above systems, including print management software 131 may be implemented in association with one or multiple modules as software system 220 (FIG. 2B). The following hardware and software embodiments are provided by way of example. It should be noted that certain hardware and software component may be interchangeably implemented in form of software or hardware, in one or more embodiments of the invention.

Hardware Environment

An embodiment of the system can be implemented as computer software in the form of computer readable code executed on a general purpose computing system 210. FIG. 2A illustrates an example of the components of computing system 210. Computing system 210 includes a central processor unit (CPU) 201, a main memory 202, an input/output controller 203, optional cache memory 204, user interface devices 205 (e.g., keyboard, pointing device), storage media 206 (e.g., hard drive, memory), a display screen 207, a communication interface 208 (e.g., a network card, a modem, or an integrated services digital network (ISDN) card), and a system synchronizer (e.g., a clock, not shown in FIG. 2A).

Processor 201 may or may not include cache memory 204 utilized for storing frequently accessed information. One or more input/output devices such as a printing or a scanning device may be attached to computing system 210. A communication mechanism, such as a bi-directional data bus 200, can be utilized to provide for means of communication between system components. Computing system 210 may be capable of communicating with one another and other systems through communication interface 208.

In one or more embodiments, computing system 210 may not include all the above components, or may include additional components for additional functionality or utility. For example, computing system 210 can be a laptop computer or other portable computing device that can send messages and receive data through communication interface 208. Computing system 210 may also be embodied in an embedded system such as a set-top box, a personal data assistant (PDA), a wireless communication unit (e.g., cellular phone), or other similar hardware platforms that have information processing and/or data storage and communication capabilities.

In embodiments of the system, communication interface 208 can send and receive electrical, electromagnetic, or optical signals that carry digital data streams representing various types of information including program code. If communication is established via the Internet, for example, computing system 210 may transmit program code through an Internet connection. The program code can be executed by central processor unit 201 or stored in storage media 206 or other non-volatile storage for later execution.

Program code may be transmitted via a carrier wave or may be embodied in any other form of computer program product. A computer program product comprises a medium configured to store or transport computer readable code or a medium in which computer readable code may be embedded. Some examples of computer program products are CD-ROM disks, ROM cards, floppy disks, magnetic tapes, computer hard drives, and network server systems.

In one or more embodiments of the invention, processor 201 is a microprocessor manufactured by Motorola, Intel, or Sun Microsystems Corporations. The named processors are for the purpose of example only. Any other suitable microprocessor, microcontroller, or microcomputer may be utilized.

Software Environment

FIG. 2B illustrates computer software 220 suited for managing and directing the operation of the hardware environment illustrated in FIG. 2A. Computer software 220 is, typically, stored in storage media 206 and is loaded into memory 202 prior to execution. Computer software 220 includes system software 221 and software application 222. Depending on system implementation, certain aspects of computer software 220 can be loaded on one or more computing systems.

System software 221 includes control software such as an operating system that controls the low-level operations of computing system 210. Low-level operations include the management of the system's resources such as memory allocation, file swapping, and other core computing tasks. In one or more embodiments of the invention, the operating system is Microsoft Windows 2000®, Microsoft Windows NT®, Macintosh OS®, or IBM OS/2®. However, any other suitable operating system may be utilized.

Software application 222 can include one or more computer programs that are executed on top of system software 221 after being loaded from storage media 206 into memory 202. In a client-server architecture, software application 222 may include a client software 222(a) and/or a server software 222(b). Referring to FIG. 1 for example, in one embodiment of the invention, client software 121 is executed on client computer 120, server software 141 is executed on server computer 140, and print management software 131 is executed on printing device 130.

Referring back to FIG. 2B, computer software 220 may also include web browser software 223 for communicating with the Internet. Further, computer software 220 includes a user interface 224 (e.g., a Graphical User Interface (GUI)) for receiving user commands and data. The commands and data received are processed by the software applications that run on the computing system 210. The hardware and software architectures and environments described above are for purposes of example only. Embodiments of the invention may be implemented in any type of system architecture or processing environment.

Software Application for Processing Print Requests

Figure 4:
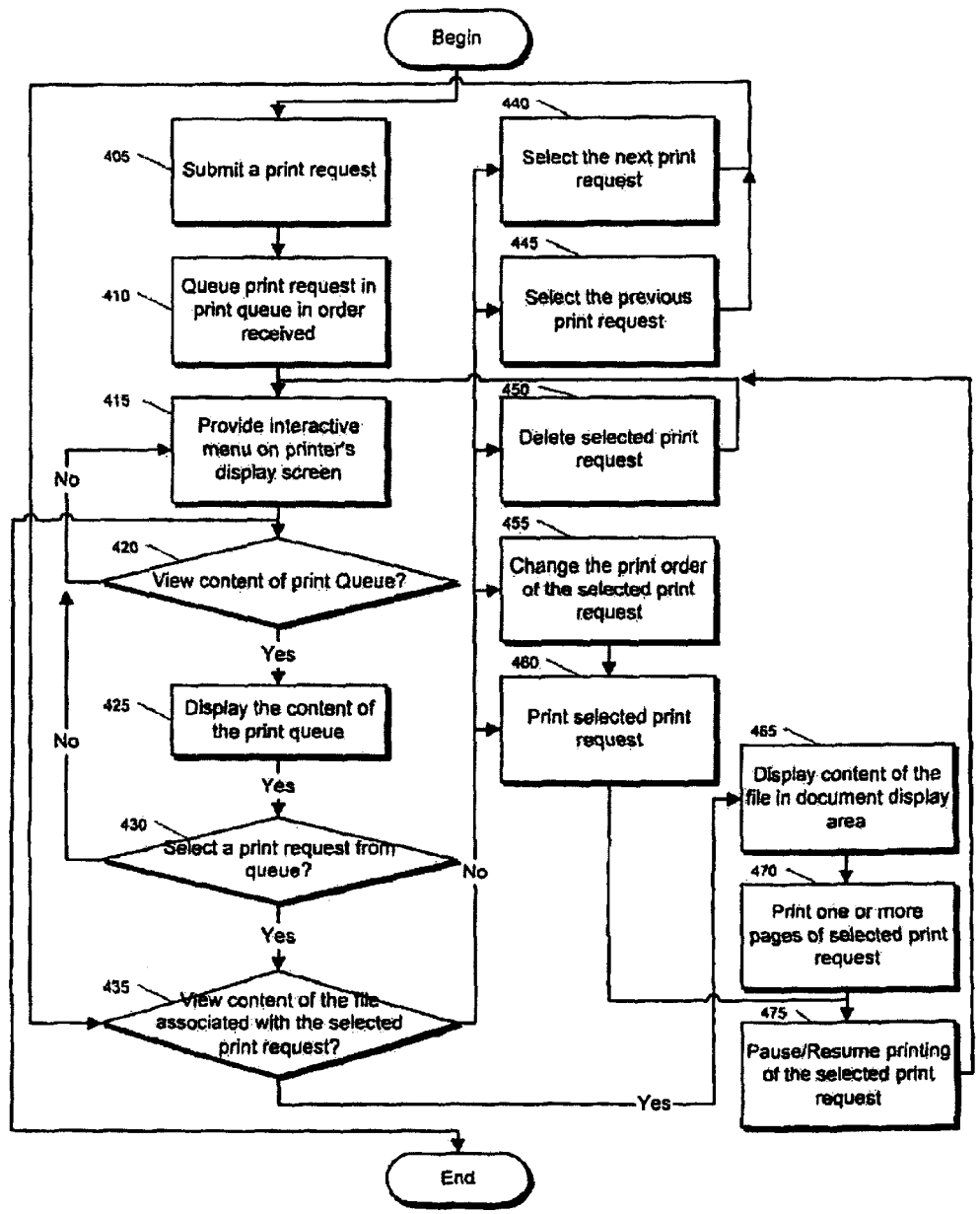
FIG. 4 illustrates a flow diagram of a method of controlling the printing process of multiple documents, in accordance with one or more embodiments of the invention.

The software application of this invention, in one or more embodiments, is implemented to facilitate and provide for processing one or more print requests submitted to a printing device by one or more client computers. Referring to FIGS. 1, 3, and 4, in accordance with one aspect of the invention, client software 121 at step 405 submits a print request via network 110 to printing device 130. Depending on implementation, the print request contains data regarding one or more files that are to be printed on printing device 130. The print request may be processed by a server computer 140 attached to network 110 or may be directly processed by printing device 130. Server computer 140 or printing device 130 include software for servicing the submitted print requests. For example, server software 141 or print management software 131 executing respectively on server computer 140 and printing device 130 may handle the task of processing a print request submitted by client software 121.

In embodiments of the system, where the print request is processed by server software 141, printing device 130 may not include a print management software 131 for handling and processing print requests. As such, server software 141 processes the data submitted in the print request and forwards the processed data in the appropriate format to printing device 130. However, if server computer 140 is not included in the system to handle the task of processing the submitted print requests, then print requests will be processed by print manager software 131. The processed requests are stored in a memory queue, at step 410, in the order received. The memory queue can be a logical data structure allocated in any type of data storage medium and may be included in printing device 130, server computer 140, or any other device directly or indirectly attached to network 110 or printing device 130.

Referring to FIG. 3, printing device 130 includes a display with a touch screen 320 for providing a user with an interactive menu to view, control, and manipulate print requests stored in the memory queue, at step 415. As shown in FIG. 3, a user may interact with printing device 130's control buttons 330 or menu bar 322 or other interactive features displayed on touch screen 320 to view and control the printing order of the documents associated with the print requests queued in the memory queue of printer 130.

In accordance with one embodiment, document list 350 includes a list of print requests pending in the memory queue in the order that the print requests are received by printing device 130. Referring back to FIG. 4, at step 420, a user has the option of viewing the content of the print queue by, for example, touching GUI button 346 ("Que") on touch screen 320. Print management software 131 (FIG. 1) is implemented to cause an interactive menu including menu bar 322, one or more GUI buttons, and document list 350 to be displayed on touch screen 320, for example.

If the user, at step 420, does not take any action, then the system continues to display the interactive menu at step 415. The user has the option to select a print request from the print queue at step 430, for example, by selecting a print request from the list displayed in document list 350. The user, in accordance with one or more embodiments of the invention, may select a print request from document list 350 either by touch or by interacting with control buttons 330, other GUI buttons displayed on touch screen 320, or other pointing mechanism known in the art. If the user does not select a print request from the queue after a predetermined period of time has passed, then the system reverts back to step 415 and provides the default interactive menus on touch screen 320. Otherwise, at step 435, the user is given the option to view the content of the file associated with the selected print request.

If the user chooses to view the content of the file associated with the selected print request, then at step 465 the content of the file is displayed in document display area 324. In certain embodiments of the invention, however, the system may automatically display the content of the file in document display area 324 as soon as the user selects the print request from the print queue at step 430. Once the content of the file is displayed on display area 324, a user may interact with menu bar 322 or other interactive features provided on printing device 130 to view different sections of the file or document.

For example, in one embodiment, the scroll bar 328 is provided to allow a user to scroll through one or more sections of the file associated with the print request. At step 470, the user may interact with menu bar 322 or other interactive features displayed on touch screen 320, for example, GUI buttons 340 and 348 to print one or more pages of the selected print request as displayed on display area 324. User interaction with control buttons 330 or GUI buttons provided on touch screen 320 may allow a user to control the operation of printing device 130 in other manners as described below.

For example, at step 440, a user may touch or select button 342 ("next") to select a print request in the print queue that is next in printing order in relationship with the currently selected print request. In some embodiments, selecting a print request results in the content of the file associated with the print request to be displayed on document display area 324. A user may also touch or select GUI button 344 ("Prior") to select a print request from the print queue that is before the currently selected print request with respect to the printing order. Once a print request has been selected from the queue a user has the option to delete that request from the queue at step 450 by, for example, touching or selecting GUI button 351 ("delete").

In certain embodiments, print management software 131 is implemented to allow a user to change the printing order of a selected print request by touching or selecting button 352 ("Reorder"), at step 455, for example. A selected print request may be printed, at step 460, by a user touching or selecting GUI button 340 ("Print"), for example. Once printing of a document has started, a user also has the option of pausing the printing of the selected print request at step 475 by touching or selecting GUI button 353 ("Pause"), for example. In certain embodiments, a paused print request may be resumed by touching or selecting GUI button 353 or by interacting with the menu bar 322 on touch screen 320.

The embodiments described above are to be considered in all aspects as illustrative only and not restrictive in any manner. Thus, other system architectures, platforms, and implementations that can support various aspects of the invention may be utilized without departing from the essential characteristics as described herein. These and various other adaptations and combinations of features of the embodiments disclosed are within the scope of the invention. The invention is defined by the claims and their full scope of equivalents.

What is claimed is:

1. A printer for servicing one or more print requests comprising:

a print queue for storing data, associated with one or more print requests;

a display screen for displaying the content of said one or more print requests; and control interface for controlling the processing of the print requests.

2. The printer of claim 1, further comprising executable code stored in a memory, wherein execution of the code by a processor causes the processor to:

in response to user interaction with the control interface, display on the display screen the print requests stored in a first order.

3. The printer of claim 2, wherein execution of the code by a processor causes the processor to:

in response to user interaction with the control interface, rearrange the order of requests stored in the queue.

4. The printer of claim 3, wherein execution of the code by a processor causes the processor to:

in response to user interaction with the control interface, select a print request stored in the queue.

5. A method for processing one or more print requests submitted to a printer, said printer having a queue, a display, and user interface, said method comprising:

storing the print requests in the queue;

displaying the print requests stored in the queue;

reconfiguring the order of the print requests stored in the queue, in response to user interaction with the user interface;

selecting a print request stored in the queue, in response to user interaction with the user interface; and printing the selected print request, in response to user interaction with to user interface.

6. The method of claim 5, further comprising:

deleting the selected print request, in response to user interaction with the user interface.

7. The method of claim 6, further comprising:

displaying the content of the file associated with the selected print request on the display; in response to user interaction with the user interface.

8. A printer for processing one or more printing requests, comprising:

means for storing data associated with said one or more print requests in a first order;

means for storing data associated with said one or more print requests in a second order;

means for displaying the content of the storing means; and means for displaying the content of said one or more print requests.

* * * * *